Feb. 29, 1972  W. G. DEICHERT ET AL  3,646,164
IMPACT RESISTANT COMPOSITIONS COMPRISING METHYL
METHACRYLATE, DIALLYL PHTHALATE AND
AN ETHYLENE COPOLYMER
Filed Sept. 11, 1970
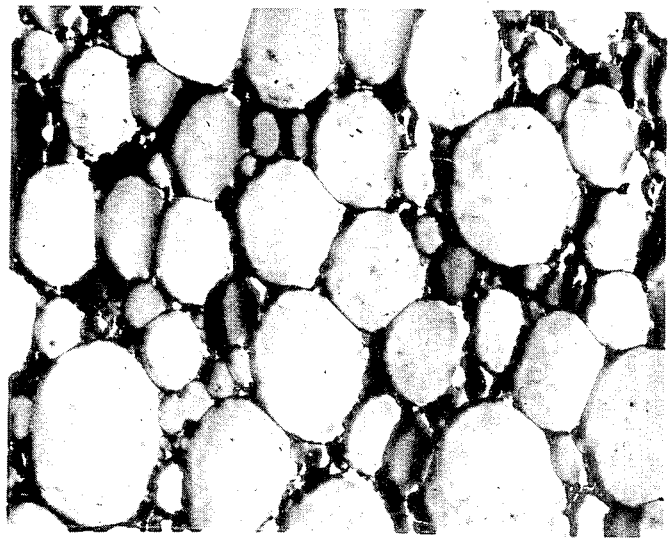
FIG. I
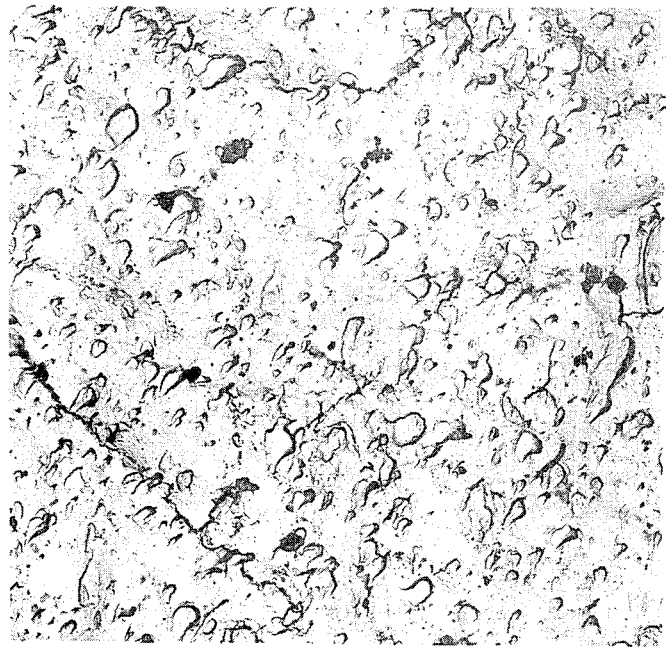
FIG. 2
INVENTORS
WILLIAM GEORGE DEICHERT
RICHARD RONALD LEMAY
BY
ATTORNEY United States Patent Office 3,646,164
Patented Feb. 29, 1972

3,646,164
IMPACT RESISTANT COMPOSITIONS COMPRISING METHYL METHACRYLATE, DIALLYL PHTHALATE AND AN ETHYLENE COPOLYMER
William George Deichert, Durham, N.H., and Richard Ronald Lemay, Meriden, Conn., assignors to American Cyanamid Company, Stamford, Conn.
Filed Sept. 11, 1970, Ser. No. 71,318
Int. Cl. C08f 25/00, 37/00
U.S. Cl. 260—878 R         7 Claims

ABSTRACT OF THE DISCLOSURE

Castable compositions of matter comprising (1) a monomeric mixture of methyl methacrylate and diallyl phthalate with or without comonomers copolymerizable therewith and (2) a copolymer of ethylene, castings thereof and a method for the production thereof, are disclosed.

BACKGROUND OF THE INVENTION

The invention described herein relates broadly to the field of high impact compositions. The invention basically resides in compositions which contain a mixture of monomeric materials and a rubbery polymer which, when cast, result in high impact articles of manufacture. More specifically, our novel compositions can be cast according to our novel method into unique articles of manufacture which may be utilized as such or otherwise thermoformed into different shapes, configurations, etc. The novel articles of manufacture possess the unique combination of properties mentioned hereinbelow.

The production of thermoplastic compositions having excellent impact strength, chemical resistance, transparency etc. is well known in the art. For instance, compositions have been prepared from blends of styrene-acrylonitrile copolymers and cross-linked butadiene-styrene rubber, see U.S. 3,073,798. Additionally, compositions have been prepared by blending a hard resin of methyl methacrylate with grafted polybutadiene or butadiene/styrene rubbers, see U.S. 3,261,887. Other compositions have been prepared from styrene and a copolymer of ethylene and vinyl acetate, see U.S. 3,162,696 while U.S. Pat. No. 3,287,444 discloses a similar suspension polymerization of methyl methacrylate-ethylene copolymer interpolymers.

Each of these prior art systems fails in at least one essential property. That is to say, the ideal impact product should possess not only high impact, excellent transparency and good weatherability but should retain these properties over a wide temperature range in order to enable their usage during all seasons in all parts of the world. One serious defect in the prior art systems is the loss of impact resistance at very low temperatures.

We have now found a novel group of articles of manufacture which not only possess a higher impact strength for a given content of rubber, a better transparency in regard to light transmission and good weatherability but retain these essential properties over a wide temperature range and thereby enable their usage in sections of the world where prior compositions fail in addition to those where the prior systems excel.

SUMMARY

The compositions of the instant invention find use as casting compositions. That is to say, they may be cast by known casting techniques into such articles as shower doors, automobile accessories, skylights, sheets and the like which may be further thermoformed into other articles.

BRIEF DESCRIPTION OF THE DRAWING

The drawing represents photomicrographs of specimens of the prior art and the instant invention. FIG. 1 represents a photomicrograph of the cast product of Example 1, below, and clearly illustrates a product having a large, round, pancake-like methyl methacrylate polymer phase surrounded by a continuous small, rubbery ethylene polymer phase which is achived via the use of diallyl phthalate.

FIG. 2, on the other hand, illustrates, via photomicrograph, the configuration of a specimen produced according to prior art procedures whereby the methyl methacrylate continuous phase is depicted as a sheet-like layer with small particles of ethylene copolymer rubber shown as intermittent protuberances throughout the horizontal plane thereof, no diallyl phthalate having been used.

DESCRIPTION OF THE INVENTION INCLUDING PREFERRED EMBODIMENTS

The ethylene copolymers used herein are generally well known in the art and their properties and methods for their preparation are more fully discussed in U.S. Pat. No. 3,287,444, mentioned above, which patent is hereby incorporated herein by reference. The rubbery copolymers we have found useful comprise (1) from about 50% to about 95% of ethylene, (2) from about 5% to about 50% of vinyl acetate, an alkyl acrylate or methacrylate, said alkyl group containing from about 1–18 carbon atoms, inclusive, acrylic acid, methacrylic acid, or mixtures of two or more of said monomers and may also contain (3) up to 20%, by weight, based on the total weight of the final ethylene polymer, i.e. that comprising (1), (2) and (3) of any of the copolymerizable monomers set forth hereinbelow in regard to the comonomers useful with methyl methacrylate. The rubbery ethylene copolymer may have a melt index, as determined by ASTM–D1238–57T (grams/10 min.), of from about 0.1 to about 500, preferably 1.0 to 350. The ethylene copolymer rubber should be present in the compositions of our invention in amounts ranging from about 3.0% to about 40.0%, by weight, preferably from about 5% to about 30%, by weight, based on the total weight of the final composition.

The methyl methacrylate portion of the composition produced by our novel process may be comprised of (A) from about 45% to about 94%, preferably about 75% to about 90%, of methyl methacrylate, (B) from about 3% to about 15%, preferably from about 5–12%, of diallyl phthalate, the remaining monomers, if any, being in addition thereto, (C) up to 50%, by weight, based on the total weight of (A) of at least one copolymerizable monomer such as the allyl, methallyl, crotyl, 1-chloroallyl, 2-chloroallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, succinic, glutaric, adipic, pimelic, suberic, azelaic, maleic, fumaric, citraconic, mesaconic, itaconic, benzoic, phenylacetic etc. acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; acrylic acid, methacrylic acid; vinyl cyclic compounds (including monovinyl aromatic hydrocarbons) e.g., styrene, o-, m-, and p-chlorostyrenes, -bromostyrenes, -fluorostyrenes, -methylstyrenes, -ethylstyrenes, -cyanostyrenes, the various polysubstituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, divinyl benzene, trivinyl benzene, allyl benzene, diallyl benzene, the various allyl cyanostyrenes, the various alpha-substituted styrenes and alpha-substituted ring-substituted styrenes, e.g. alpha-methyl styrene, alpha-methyl-para-methyl styrene, etc.; unsaturated ethers, e.g., ethyl vinyl ether, diallyl ether, etc.; unsaturated amides, for instance, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; unsaturated polyhydric alcohol (e.g., butenediol, etc.) esters of saturated and unsaturated, aliphatic and aromatic, monobasic and polybasic acids, and the like.

Other examples of monomers that can be used with the methyl methacrylate and diallyl phthalate are the vinyl halides, more particularly vinyl chloride, vinyl bromide and vinyl iodide, and the various vinylidene compounds, including the vinylidene bromide, vinylidene fluoride and vinylidene iodide.

Among other comonomers which may be used with the methyl methacrylate and diallyl phthalate are, for example, compounds such as acrylonitrile, and other compounds, e.g., the various substituted acrylonitriles (e.g. methacrylonitrile, phenylacrylonitrile, etc.) the various N-substituted acrylamides and alkacrylamides, for instance, N-dialkyl acrylamides and methacrylamides, e.g. N-dimethyl, -diethyl, -dipropyl, -dibutyl, etc., acrylamides and methacrylamides, also other acrylates and methacrylates such as methyl acrylate, n-hexyl acrylate, t-butyl methacrylates, stearyl methacrylate and the like.

While not wishing to be bound by any particular theory regarding the castable compositions of the present invention, we believe that the diallyl phthalate utilized herein functions unusually and unexpectedly in that it appears that the diallyl phthalate migrates to or is associated with the ethylene polymer when the monomers are mixed therewith. The diallyl phthalate remains associated with the rubber during the initial temperature rise during the casting of the novel compositions. This causes the rubbery ethylene polymer to remain continuous and thereby form a cell-like structure resembling a honeycomb and not elastomeric particles as is usually the case. The methyl methacrylate in the meantime is polymerizing by itself into a hard, discontinuous polymer phase which is surrounded by or coated with the ethylene polymer phase. Once the casting procedure is continued at the higher temperatures, the diallyl phthalate then functions to cross-link the ethylene polymer. Some grafting of methyl methacrylate and other monomer onto the ethylene polymer is also occurring at this higher temperature as well as at the lower initial temperatures. It is this unique configuration, as more clearly shown in the accompanying photomicrograph, which enables the resultant castings to be of exceptionally high impact strength both at room temperature and over a large temperature range including such low conditions as $-40°$ C.

This classic result appears to be caused solely by the use of diallyl phthalate in combination with the specific conditions of casting more specifically discussed hereinbelow. Materials commonly believed equivalent to diallyl phthalate such as diallyl fumarate, diallyl maleate, divinyl benzene, triallyl cyanurate etc. have not proven effective in the instant invention.

A further observation regarding our novel system resides in the fact that the catalyst or catalysts utilized appear to also concentrate at the ethylene polymer phase with the diallyl phthalate and thereby assist in maintaining the integrity of the rubber as opposed to the hard, resinous polymer formed from the methyl methacrylate.

Our novel process comprises dispersing the ethylene copolymer in the monomers being used to form the resin component. The resultant mixture of methyl methacrylate, diallyl phthalate, other monomers if desired, ethylene polymer and catalysts is then poured into a casting cell of the type generally used for casting acrylic sheets, see, for example U.S. Pats. Nos. 2,369,593; 2,067,580 or British Pat. No. 1,168,946, which patents are hereby incorporated herein by reference. Other ingredients such as ultraviolet light absorbers, antioxidants, pigments, dyes, photochromic materials, fillers etc. generally used may also be added before filling the casting cell with the casting composition.

The casting operation, as mentioned above, is carried out in the presence of polymerization catalysts. It is extremely critical that the catalysts used according to our novel process be free-radical generating catalysts having a half-life of about 10 hours between about 212° F. and 350° F. These catalysts are used in amounts ranging from about 0.1% to about 3.5%, by weight, preferably from about 0.75% to about 1.5%, based on the total weight of the total composition.

Examples of suitable catalysts possessing the above requirements include t-butyl perbenzoate, 2,5-dimethyl-2,5-bis-(t-butylperoxy)-n-hexane, t-butyl hydroperoxide, cumene hydroperoxide, 2,5-dimethylhexyl - 2,5 - dihydroperoxide, p-menthane hydroperoxide, di-t-butyl peroxide, mixtures thereof and the like. If desired, for purposes of increasing the effectiveness of the methyl methacrylate phase polymerization during the early stages of temperature increase, catalysts having a half-life of at least about 10 hours at 176° F. or below, may be added along with the above-mentioned catalysts to the casting composition. The use of this class of catalysts as a mixture with those above set forth is preferable but not critical according to our novel casting process. These catalysts are also free-radical generating catalysts and are employed in amounts ranging from about 0.0008% to about 0.2%, preferably from about 0.005% to about 0.15%, by weight, also based on the total weight of the total composition. Exemplary catalysts include benzoyl peroxide, lauroyl peroxide, t-butyl peroctoate, 2,5-dimethyl-2,5-bis(2-ethylhexanoyl peroxy)-n-hexane, 2,4-dichlorobenzoyl peroxide, t-butylperoxy pivalate, propionyl peroxide, decanoyl peroxide, caproyl peroxide, p-t-butylcyclohexylperoxy dicarbonate and the like.

Our casting process comprises heating the methyl methacrylate, alone or with copolymerizable monomers, diallyl phthalate, ethylene polymer, with or without, preferably without, catalyst etc. to a temperature of from about 160–180° F. This step is critical and cannot be dispensed with in our novel process. The hot composition is then poured into the casting cell, after mixing catalyst therewith if not added previously, where it is heated to a temperature of at least about 100° F. but not higher than 212° F. for from about 3–24 hours. As can be readily observed, at temperatures of 160–180° F. the composition will set to a hard polymeric mass if an extraordinarily long time is allowed to lapse between heating the composition and filling the casting cell. It is, of course, essential that the composition is not allowed to completely set, but some degree of polymerization of the composition is tolerable before the filling of the casting cell. Therefore, the composition must, of necessity, be pourable. A period of from about 1 to about 2 hours is a generally permissible lapse of time between heating and filling the casting cell.

After the first stage of polymerization is complete, the casting cell is then heated to a temperature of at least about 250° F., preferably from about 270° F. to about 300° F. but in no case higher than the degradation temperature of the polymer, for from about 30 minutes to 4 hours, preferably from about 45 to about 90 minutes.

This second heating step causes the diallyl phthalate to cross-link the ethylene polymer and also causes a final complete polymerization of the methacrylate and other monomers, if remaining, to a hard polymeric material.

The cell can thereafter be heated to an intermediate temperature ranging between 212° F. to 250° F., if desired in order to assure complete grafting and polymerization of the methyl methacrylate and other monomers, if present, although no particular advantage has been found for such a step.

The casting cell is then cooled down to handling temperature and the resultant cast sheet is removed as conventionally known.

As mentioned above, the resultant casting can then be utilized as such or subsequently thermoformed into such articles as signs, light fixtures, bullet-resistant shields, roofs for sight-seeing buses, skylights and the like.

The following examples are set forth for purposes of illustration only and are not to be construed as limitations on the present invention except as set forth in the appended claims. All parts and percentages are by weight unless otherwise specified.

EXAMPLE 1

In a suitable reaction vessel equipped with a heater, thermometer and stirrer, 85 parts of methyl methacrylate monomer are added to 10 parts of an ethylene/vinyl acetate copolymer (75/25 and having a melt index of 2) and 5 parts of diallyl phthalate. The charge is heated at 180° F. until the mixture becomes clear and homogeneous. Then 0.1 part of tertiary butyl peroctoate and 1.0 part of tertiary butyl perbenzoate, as catalyst, are added to the mixture. The solution is then poured into a casting cell which is pre-heated to 130° F. The casting is kept at 130–140° F. for 6 hours and is then heated over one hour to 280° F. and held at that temperature for 3 hours. The cell is cooled to room temperature. The resulting sheet has a transparency of 88.6% and a Barcol hardness value of 12. The Izod impact value at room temperature is 1.30 foot-pounds per inch notched. A photomicrograph of a specimen taken from the recovered casting is set forth as FIG. 1 of the drawing. Other properties of the casting are set forth hereinbelow.

Izod impact:
- At R.T. notched _____ ft.-lbs./in. __ 1.30
- At 0° C. notched _____do____ 1.30
- At −20° C. notched _____do____ 1.14
- At −40° C. notched _____do____ 1.08
- At R.T. unnotched _____do____ 23.00

Tensile properties:
- Modulus×$10^6$ p.s.i. _____ .18
- Strength×$10^3$ p.s.i. _____ 7.60
- Percent elong. at $y$ _____ 2.50
- Percent elong. at $b$ _____ 36.90
- Stress×$10^3$ p.s.i. at $y$ _____ 2.90

Flex. str. and mod.:
- Flex. mod.×$10^6$ lb./sq. in. _____ 0.16
- Fiber stress×$10^3$ lb./sq. in. _____ 6.40
- Strain at fail in./in. _____ 0.080

Deflection tem. (264 p.s.i.):
- Annealed, ° C. _____ 69
- Unannealed, ° C. _____ 59

Deformation under load (4,000 p.s.i. at 50° C.):
- Percent deformation _____ 8.01

Compressive strength:
- Compressive stress×$10^3$ p.s.i. _____ 8.8

Rockwell hardness:
- "R" scale _____ 103

Dielectric constants:
- At 60 Hz. _____ 3.28
- At $10^3$ Hz. _____ 3.03
- At $10^6$ Hz. _____ 2.67

Dissipation factor:
- At 60 Hz. _____ 0.049
- At $10^3$ Hz. _____ 0.037
- At $10^6$ Hz. _____ 0.025

Flammability:
- Burning rate in./min. _____ 0.75

Thermal conductivity:
- B.t.u. in./ft.$^2$/hr./° F. _____ 1.15

Coefficient of linear expansion:
- Coeff. LTE/° C.×$10^{-5}$ _____ 9.3
- Coeff. LTE/° F.×$10^{-5}$ _____ 5.2

EXAMPLE 2

Eighty-five (85) parts of methyl methacrylate monomer are added to 10 parts of an ethylene-vinyl acetate-acrylic acid terpolymer (containing 25 parts of vinyl acetate, and having a melt index of 500, and an acid number of 6) and 5 parts of diallyl phthalate. The mixture is heated to 160° C. and stirred until clear and homogeneous. When homogeneous, 0.1 part of tertiary butyl peroctoate is added to the solution along with 0.01 part of commercially available p-t-butylcyclohexylperoxy dicarbonate and 1 part of tertiary butyl perbenzoate as catalyst. The formulation is cast in the same manner and conditions as Example 1. The casting resulting from this formulation has an Izod impact value of .82 ft. lb. per in. at room temperature.

EXAMPLE 3

Eightly-five (85) parts of methyl methacrylate monomer are added to 10 parts of an ethylene/vinyl acetate/acrylic acid terpolymer (containing 25 parts of vinyl acetate, by weight, and having an acid number of 6, and a melt index of 6) and 5 parts of diallyl phthalate monomer. The charge is heated to 180° F. and stirred until clear and homogeneous. 0.1 part of tertiary butyl peroctoate is then added along with 0.01 part of a commercially available p-t-butylcyclohexylperoxy dicarbonate and 1 part of tertiary butyl perbenzoate as catalyst. The solution is cast as set forth in Example 1. The resulting casting has an Izod impact of 1.26 f.p.p.i. at room temperature.

EXAMPLE 4

Eighty-five (85) parts of methyl methacrylate monomer are added to 10 parts of an ethylene/vinyl acetate copolymer (containing 40 parts of vinyl acetate, by weight, and having a melt index of 55) and 5 parts of diallyl phthalate. The same mixing procedure and casting method is used as in Example 1. The resulting cast sheet has an Izod impact strength of 1.18 ft. lbs. per in. and a Barcol hardness value of 12.

EXAMPLE 5

Eighty-eight (88) parts of methyl methacrylate monomer are added to 8 parts of an ethylene/vinyl acetate copolymer (containing 25% vinyl acetate, by weight, and having a melt index of 2), 1 part of benzyl alcohol, and 4 parts of diallyl phthalate monomer. The charge is heated at about 180° F. until the mixture becomes clear and homogeneous. Then the catalyst system of Example 1 is added and the resultant solution is thoroughly mixed. The mixture is then poured into a glass casting cell preheated to 130° F. and the cell is heated according to Example 1. The resulting sheet has a Barcol hardness value of 9 and good transparency. The Izod impact is 1.57 ft. lbs. per in.

EXAMPLE 6

Eighty-five (85) parts of methyl methacrylate monomer are added to 10 parts of an ethylene/vinyl acetate copolymer (containing 25% of vinyl acetate, by weight, and having an inherent viscosity of 1.05 at 30° C., and a melt index of 2), 0.5 part of polycaprolactone (having a molecular weight of 40,000) and 4.5 parts of diallyl phthalate monomer. The mixture is heated at about 170° C. until the solution becomes clear and homogeneous. The catalyst system of Example 1 is then added with stirring. The solution is added to a preheated cell and cured in the manner set out in Example 1. The resulting sheet has good transparency and a Barcol hardness of 5. The Izod impact value is 1.42 f.p.p.i.

Following the procedure of Example 1, various other castings were prepared with varying amounts of different methyl methacrylate monomer mixtures and different ethylene copolymer rubbers. In each instance, excellent castings were recovered with impact strengths, hardness etc. superior to analogous compositions void of diallyl phthalate. The charge materials are set forth in Examples 7–10, below.

EXAMPLE 7

(a) A copolymer of ethylene and stearyl methacrylate (95/5), and (b) methyl methacrylate, vinyl acetate and acrylic acid (90/5/5), the amount of (a) being 15% and the amount of (b) being 70% of the total composition. The diallyl phthalate content is 15% of the total composition.

EXAMPLE 8

(a) A copolymer of ethylene and methyl acrylate (50/50), and (b) methyl methacrylate, ethyl acrylate and vinyl acetate (50/40/10), the amount of (a) being 3%, the amount of (b) being 94% and the diallyl phthalate being 3% of the total composition.

EXAMPLE 9

(a) A copolymer of ethylene and methacrylic acid (85/15) and (b) methyl methacrylate, methyl acrylate and stearyl methacrylate (90/8/2), the amount of (a) being 35% and the amount of (b) being 60% of the total composition, the remaining 5% being diallyl phthalate.

EXAMPLE 10

(a) A copolymer of ethylene and acrylic acid (90/10) and (b) methyl methacrylate, vinyl acetate and acrylonitrile (85/10/5), the amount of (a) being 20%, and the amount of (b) being 70% of the total composition, the remaining 10% being diallyl phthalate.

EXAMPLE 11

The procedure of Example 1 is again followed with a copolymer of ethylene and butyl acrylate (75/25) substituted for the rubbery copolymer shown therein. A casting having comparable properties is recovered.

EXAMPLE 12

The procedure of Example 1 is again followed except that the rubbery copolymer comprises a copolymer of ethylene and lauryl methacrylate (80/20). A casting similar in properties to that of Example 1 is recovered.

EXAMPLE 13

Example 2 is again followed except that an ethylene/vinyl acetate/acrylonitrile (80/10/10) rubbery polymer is cast with methyl methacrylate, ethyl acrylate and acrylic acid (90/5/5). The resultant composition has excellent properties with and without the addition of UV stabilizers and antioxidants.

EXAMPLE 14

Following the procedure of Example 2 except that an ethylene/stearyl acrylate (75/25) rubbery copolymer is used, results similar to those shown therein are achieved.

EXAMPLE 15

Example 5 is again followed except that the rubbery ethylene polymer comprises ethylene/vinyl acetate/methacrylic acid (75/20/5). Similar results are achieved.

EXAMPLE 16

Example 1 is again followed except that the rubbery ethylene polymer comprises ethylene/vinyl acetate/vinyl chloride (75/20/5). The resultant composition again has properties comparable to those of the product of said example.

EXAMPLE 17

A terpolymer of ethylene/vinyl acetate/acrylic acid (75/20/5) is cast with methyl methacrylate and ethyl acrylate as described in Example 3. A casting having excellent impact strength over a wide temperature range is recovered.

EXAMPLE 18

Example 3 is again followed except that the rubbery ethylene polymer comprises ethylene/vinyl acetate/methyl methacrylate (70/10/20). An excellent casting is recovered.

EXAMPLE 19

Example 1 is again followed with an 80/15/5 terpolymer of ethylene/ethyl acrylate/methyl crotonate being used in lieu of the ethylene polymer disclosed therein. The resultant cast sheet has attractive properties.

EXAMPLE 20

The procedure of Example 4 is followed except that the ethylene rubbery polymer comprises ethylene/ethyl acrylate/α-methyl styrene (80/18/2). The properties of the resultant casting are again excellent.

EXAMPLE 21

Example 5 is again followed. An ethylene/ethyl acrylate/vinylidene chloride (70/20/10) rubbery polymer is used in place of that disclosed therein. A comparable product is recovered.

EXAMPLE 22

Example 2 is followed utilizing an ethylene/ethyl acrylate/acrylamide rubbery polymer (80/17/3) instead of that used therein. An excellent cast sheet is recovered.

What is claimed is:

1. A castable composition of matter comprising from about 45% to about 94%, by weight, based on the total weight of the composition, of (A) a monomeric mixture of (a) at least 50%, by weight, of methyl methacrylate, and (b) up to 50%, by weight, based on the weight of (a), of at least one other monoethylenically unsaturated monomer copolymerizable with (a), (B) from about 3% to about 15%, by weight, based on the total weight of the composition, of diallyl phthalate and (C) from about 3% to about 40%, by weight, based on the total weight of the composition, of a polymer of (1) from about 50% to about 95% of ethylene, (2) from about 5% to about 50% of a comonomer selected from the group consisting of vinyl acetate, alkyl acrylates and methacrylates, said alkyl groups having from 1–18 carbon atoms, inclusive, acrylic acid, methacrylic acid and mixtures thereof and (3) up to 20%, by weight, based on the total weight of (1), (2) and (3), of another monomer copolymerizable with said (1).

2. A method for producing a casting which comprises (I) heating a composition of matter comprising from about 45% to about 94%, by weight, based on the total weight of the composition, of (A) a monomeric mixture of (a) at least 50%, by weight, of methyl methacrylate, (b) up to 50%, by weight, based on the weight of (a), of at least one other monoethylenically unsaturated monomer copolymerizable with (a), (B) from about 3% to about 15%, by weight, based on the total weight of the composition, of diallyl phthalate and (C) from about 3% to about 40%, by weight, based on the total weight of the composition, of a polymer of (1) from about 50% to about 95% of ethylene, (2) from about 5% to about 50% of a comonomer selected from the group consisting of vinyl acetate, alkyl acrylates and methacrylates, said alkyl groups having from 1–18 carbon atoms, inclusive, acrylic acid, methacrylic acid and mixtures thereof and (3) up to 20%, by weight, based on the total weight of (1), (2) and (3), of another monomer copolymerizable with said (1), to a temperature of from about 160 to about 180° F., (II) pouring the resultant mixture into a casting cell, (III) heating said cell to at least about 100° F. in the presence of from about 0.1% to about 3.5%, by weight, based on the weight of said composition, of a free-radical generating catalyst having a half-life of about 10 hours between about 212° F. to about 350° F. for about 3–24 hours, (IV) heating the resultant material to a temperature of at least about 250° F. for up to about 4 hours and (V) recovering the resultant casting.

3. The composition of claim 1 wherein (a) is 100% methyl methacrylate, (2) is vinyl acetate and (3) is acrylic acid.

4. The method of claim 2 wherein (a) is 100% methyl methacrylate, (2) is vinyl acetate and (3) is acrylic acid.

5. A method according to claim 2 wherein said (III) is conducted in the presence of from about 0.008% to about 0.2%, by weight, same basis, of a second free-radical generating catalyst, which second catalyst has a half-life of at least about 10 hours at 176° F. or below.

6. A method according to claim 5 wherein (a) is 100% methyl methacrylate, (2) is vinyl acetate and (3) is acrylic acid.

7. The product produced by the process of claim 2.

References Cited

UNITED STATES PATENTS 3,137,674　6/1964　Marans et al. _____ 260—878 R

FOREIGN PATENTS 691,908　5/1953　Great Britain _____ 260—886

JOSEPH L. SCHOFER, Primary Examiner

A. HOLLER, Assistant Examiner